(12) United States Patent
Fontaine et al.

(10) Patent No.: US 10,809,742 B2
(45) Date of Patent: Oct. 20, 2020

(54) SYSTEM AND METHOD FOR TIRE SENSOR-BASED AUTONOMOUS VEHICLE FLEET MANAGEMENT

(71) Applicant: The Goodyear Tire & Rubber Company, Akron, OH (US)

(72) Inventors: Sebastien Willy Fontaine, Vichten (LU); Armand Rene Gabriel Leconte, Bigonville (LU); Frederic Ngo, Blaschette (LU); Etienne Besnoin, Luxembourg (LU); Eduard Robert Geerdink, Amsterdam (NL); Jeroen Rigole, Schoten (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 175 days.

(21) Appl. No.: 15/897,679

(22) Filed: Feb. 15, 2018

(65) Prior Publication Data

US 2018/0253109 A1 Sep. 6, 2018

Related U.S. Application Data

(60) Provisional application No. 62/467,287, filed on Mar. 6, 2017.

(51) Int. Cl.
*G05D 1/02* (2020.01)
*G05D 1/00* (2006.01)
(Continued)

(52) U.S. Cl.
CPC ....... *G05D 1/0291* (2013.01); *B60C 23/0479* (2013.01); *G05D 1/0088* (2013.01);
(Continued)

(58) Field of Classification Search
CPC ............... G05D 1/0291; G05D 1/0088; G05D 2201/0213; B60C 23/0479; B60C 11/246; B60C 23/0488; B60C 23/20; G07C 5/008
See application file for complete search history.

(56) References Cited

U.S. PATENT DOCUMENTS 4,773,011 A 9/1988 VanHoose
7,827,053 B2 11/2010 Kalnicki et al.
(Continued)

FOREIGN PATENT DOCUMENTS

EP 3020578 B1 9/2017
WO 2005113261 A1 12/2005
WO WO2017015380 A1 1/2017

OTHER PUBLICATIONS

M. Junger, "Introduction to J1939", Apr. 27, 2010 (Year: 2010).*
EPO search report completed Jul. 12, 2018.

*Primary Examiner* — Russell Frejd
(74) *Attorney, Agent, or Firm* — Edward T. Kennedy

(57) ABSTRACT

A system for sensing tire parameters in the remote monitoring and management of a fleet of autonomous vehicles is provided. The system includes at least one autonomous vehicle that is supported by at least one tire. At least one sensor is affixed to the tire for sensing tire parameters. Means are provided for communicating data generated by the sensor to a control system on the vehicle, and a mobile network receives the sensor data from the vehicle control system. A fleet management server receives the sensor data from the mobile network, and means are provided to generate commands for the autonomous vehicle in real time based upon the data generated by the sensor. A method for sensing tire parameters in the remote monitoring and management of a fleet of autonomous vehicles is also provided.

20 Claims, 11 Drawing Sheets

(51) Int. Cl.
  *B60C 23/04*   (2006.01)
  *G07C 5/00*    (2006.01)
  *B60C 11/24*   (2006.01)
  *B60C 23/20*   (2006.01)

(52) U.S. Cl.
  CPC ............ *G07C 5/008* (2013.01); *B60C 11/246* (2013.01); *B60C 23/0488* (2013.01); *B60C 23/20* (2013.01); *G05D 2201/0213* (2013.01)

(56) References Cited

U.S. PATENT DOCUMENTS

| | | |
|---|---|---|
| 7,944,346 B2 | 5/2011 | De Castro et al. |
| 8,805,419 B2 | 8/2014 | Marr et al. |
| 9,079,461 B2 | 7/2015 | Suh et al. |
| 9,418,492 B2 | 8/2016 | Sinner et al. |
| 9,566,986 B1 | 2/2017 | Gordon et al. |
| 9,783,024 B2 | 10/2017 | Connell et al. |
| 2009/0307031 A1 | 12/2009 | Winkler et al. |
| 2012/0029759 A1 | 2/2012 | Suh et al. |
| 2013/0046418 A1* | 2/2013 | Anderson ............... G07C 5/085 701/2 |
| 2016/0129734 A1 | 5/2016 | Sinner et al. |
| 2016/0129737 A1 | 5/2016 | Singh et al. |
| 2016/0280040 A1 | 9/2016 | Connell et al. |
| 2016/0342915 A1* | 11/2016 | Humphrey ....... G06Q 10/06313 |
| 2017/0023372 A1 | 1/2017 | Van Latum et al. |
| 2017/0320363 A1* | 11/2017 | Hung .................. B60C 23/0459 |
| 2018/0022187 A1 | 1/2018 | Connell et al. |
| 2018/0052463 A1* | 2/2018 | Mays ...................... B60T 17/18 |
| 2018/0196427 A1* | 7/2018 | Majumdar ............ B60W 50/14 |

* cited by examiner

| ☰ TIRE PRESSURE MONITORING | DATE: TU OCT 26 TIME: 13:26 |

  347 TIRES → 97.47% PRESSURE OK   9 TIRES → 2.53% NEED MAINTENANCE 

VEHICLES AFFECTED

| | |
|---|---|
| VEHICLE #0002 | Solve issue |
| VEHICLE #0023 | Driving to service station: 12:30 OCT 26 |
| VEHICLE #1922 | Solve issue |
| VEHICLE #4832 | Solve issue |
| VEHICLE #5412 | Solve issue |
| VEHICLE #9475 | Solve issue |
| VEHICLE #8234 | Car parked! Waiting for mobile service... |
| VEHICLE #1932 | Car parked! Waiting for mobile service... |
| VEHICLE #0405 | Solve issue |

FIG. 3d

| TIRE PRESSURE MONITORING | DATE: TU OCT 26 TIME: 13:26 |

347 TIRES → 97.47% PRESSURE OK

9 TIRES → 2.53% NEED MAINTENANCE

VEHICLES AFFECTED    9

| VEHICLE #0002 | Solve issue |
| VEHICLE #0023 | Driving to service station: 12:30 OCT 26 |
| VEHICLE #1922 | Solve issue |
| VEHICLE #4832 | Solve issue |

VEHICLE #5412

| NOW | SET | TODAY | 16 | 50 | CANCEL |

| VEHICLE #9475 | Solve issue |
| VEHICLE #8234 | Car parked! Waiting for mobile service... |
| VEHICLE #1932 | Car parked! Waiting for mobile service... |
| VEHICLE #0405 | Solve issue |

FIG. 3f

TIRE WEAR
DATE: TU OCT 26 TIME: 13:26

| >6mm | 5-6mm | 4-5mm | 3-4mm | 2-3mm | <2mm |
|------|-------|-------|-------|-------|------|
| 20%  | 10%   | 30%   | 20%   | 10%   | 10%  |

[ ALL VEHICLES ]  [ CHOOSE VEHICLE ID# ]  [ WEAR ▽ ]  [ TIRE ▽ ]

YOUR CHOICE:  [ below 3mm ✕ ]  [ Goodyear Inteli Grip Urban ✕ ]

VEHICLE #0101        OK below 3 mm
5.0 — 2.0
5.0 — 2.0

[ DRIVE TO SERVICE STATION ]

[ PARK & WAIT FOR MOBILE SERVICE ]

| VEHICLE #0054 | below 3 mm |
| VEHICLE #9205 | OK |
| VEHICLE #9567 | OK |
| VEHICLE #0050 | Tire replacement planned in 2 weeks |
| VEHICLE #1038 | Tire replacement planned in 2 weeks |
| VEHICLE #1990 | OK |
| VEHICLE #2940 | OK |
| VEHICLE #0006 | OK |

FIG. 3h

SYSTEM AND METHOD FOR TIRE SENSOR-BASED AUTONOMOUS VEHICLE FLEET MANAGEMENT

FIELD OF THE INVENTION

The present invention generally relates to tire sensors and tire monitoring systems. More particularly, the invention relates to systems that measure tire parameter data during vehicle operation. Specifically, the present invention is directed to a system, as well as a method, which senses tire parameters for use in the management of a fleet of autonomous vehicles to optimize vehicle usage and performance.

BACKGROUND OF THE INVENTION

As the sophistication of electronic devices has progressed, it has become desirable to integrate such devices into pneumatic tires. These electronic devices include sensors and other components for obtaining information regarding various physical parameters of a tire, such as temperature, pressure, number of tire revolutions, vehicle speed, and the like. Such parameters may be useful in monitoring the performance of a tire. In addition, sensors and other components have been used to determine mileage on a tire and tire wear for potential replacement. For the purpose of convenience, such electronic devices and components shall collectively be referred to herein as sensors.

While such sensors are useful, they do not work in an optimum manner for fleets of autonomous vehicles. A passenger vehicle is a vehicle such as a car or truck that is capable of legally operating and navigating on urban streets, highways and other roads without a human driver. In the prior art, tire sensors have provided information regarding tire parameters to a human driver, or to a manager of a fleet, who in turn may pass information or instructions along to a human driver. In each case, the human driver must adjust the vehicle behavior in response to information from the sensors. For example, if an under-inflated tire signal is sent, the human driver had to inflate the tire or bring the vehicle to a service center for inflation of the tire. In an autonomous vehicle, there is no human driver to respond to such a signal.

As a result, there is a need in the art for a system, as well as a method, which senses tire parameters for use in the remote monitoring and management of a fleet of autonomous vehicles in real time to optimize vehicle usage and performance.

SUMMARY OF THE INVENTION

According to an aspect of an exemplary embodiment of the invention, a system for sensing tire parameters in remote monitoring and management of a fleet of autonomous vehicles includes at least one autonomous vehicle supported by at least one tire. At least one sensor is affixed to the tire for sensing tire parameters, and means are provided for communicating data generated by the sensor to a mobile network. A fleet management server receives the sensor data from the mobile network, and means are provided for generating commands for the autonomous vehicle in real time based upon the data generated by the sensor.

According to an aspect of another exemplary embodiment of the invention, a method for sensing tire parameters in remote monitoring and management of a fleet of autonomous vehicles includes affixing at least one sensor to at least one tire of at least one autonomous vehicle. Tire parameters are measured tire parameters with the sensor, and data generated by the sensor is communicated to a mobile network. The sensor data is received on a fleet management server from the mobile network, and commands are generated for the autonomous vehicle in real time based upon the data generated by the sensor.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Affixed" means attached to a tire or joined to a tire by any means known to those skilled in the art, including adhesion, mechanical structures, integral forming in the tire, and the like.

"Axial" and "axially" means lines or directions that are parallel to the axis of rotation of the tire.

"Autonomous vehicle" is a car or truck that is capable of legally operating and navigating on urban streets, highways and other roads without a human driver.

"CAN-Bus" is a communications network inside a vehicle that interconnects microcontrollers and devices to enable them to communicate with each other in applications in the vehicle.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Outboard side" means the side of the tire farthest away from the vehicle when the tire is mounted on a wheel and the wheel is mounted on the vehicle.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

BRIEF DESCRIPTION OF THE DRAWINGS

The invention will be described by way of example and with reference to the accompanying drawings, in which:

FIGS. 3*a* through 3*i* are screen shots of an interface employed in conjunction with the system shown in FIG. 1.

Similar numerals refer to similar parts throughout the drawings.

DETAILED DESCRIPTION OF EXAMPLES OF THE PRESENT INVENTION

Figure 2:
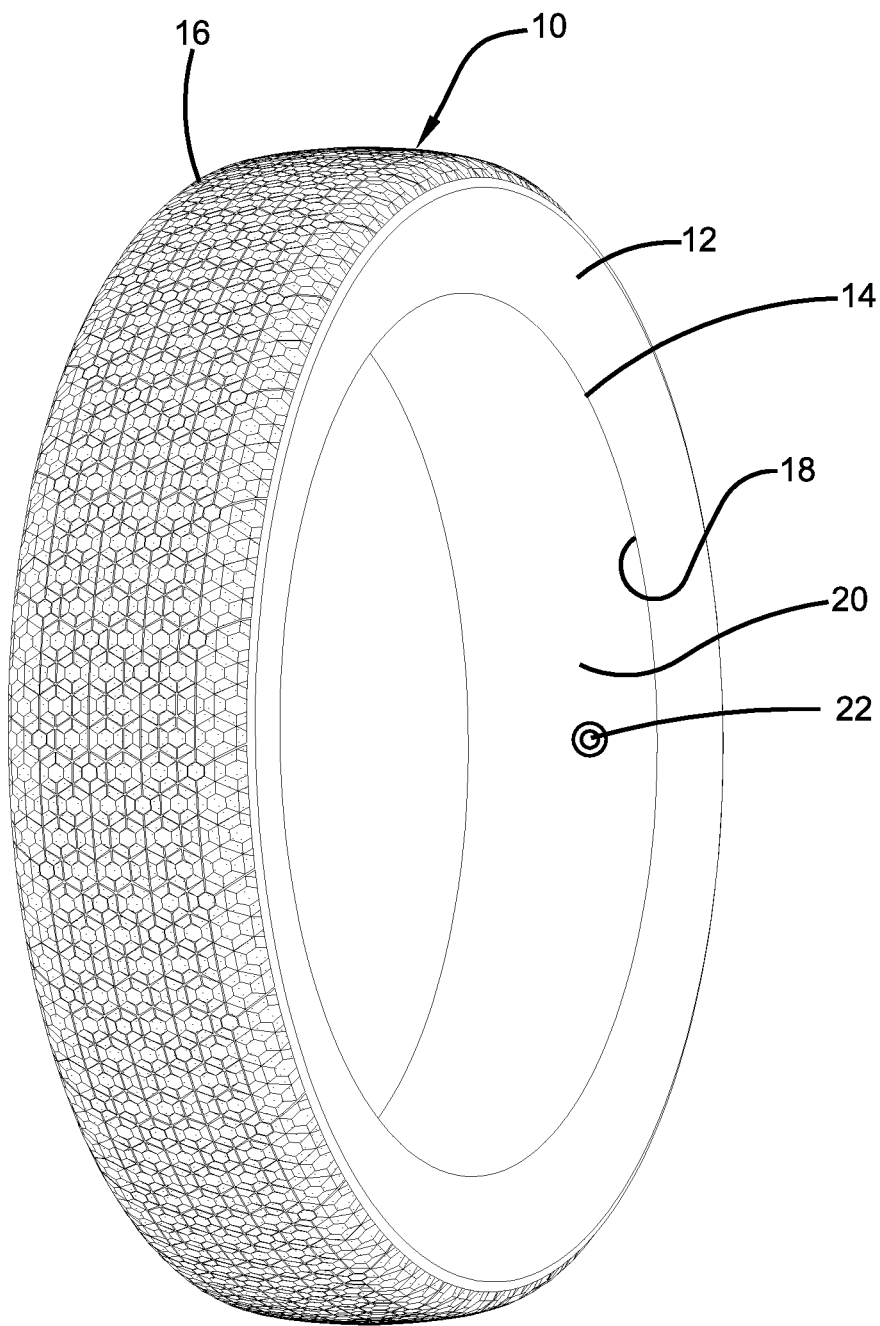
FIG. 2 is a perspective view of a tire employed in conjunction with the system shown in FIG. 1.

Turning first to FIG. 2, an exemplary tire for an autonomous vehicle is indicated at 10. The tire 10 is of conventional pneumatic construction and includes a pair of sidewalls 12 (only one shown), each of which extends from respective bead area 14 (only one shown) to a tread 16. An inner liner 18 defines an air cavity 20. At least one tire sensor 22 is affixed to the inner liner 18 or other component of the tire 10 by suitable means such as an adhesive, mechanical fasteners, integral forming, and the like. It is to be understood that one tire sensor 22 may be employed in each tire 10, or multiple sensors may be employed in each tire. Reference herein shall be made to a sensor 22 with such understanding.

Figure 1:
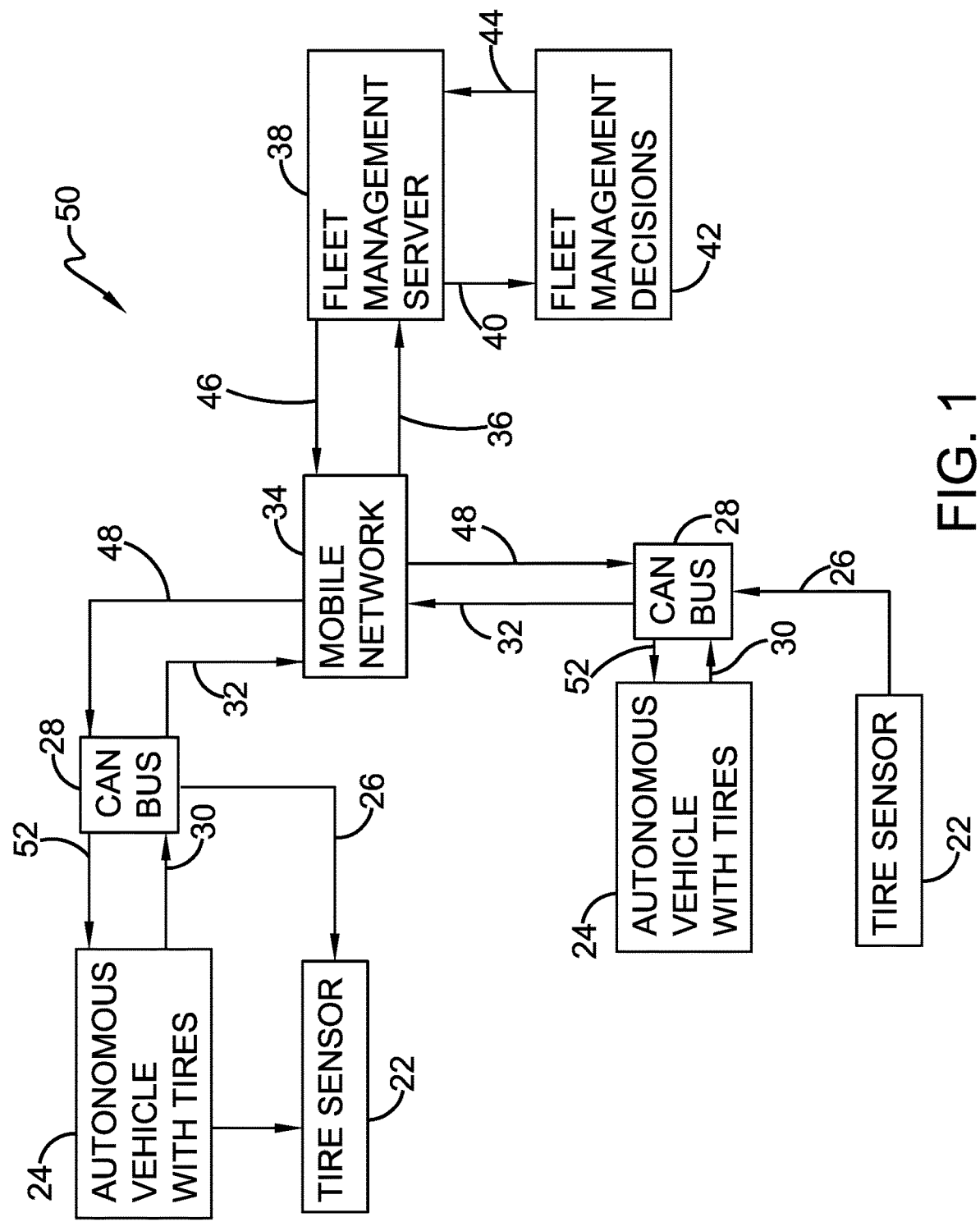
FIG. 1 is a schematic representation of an exemplary embodiment of a system for tire sensor-based autonomous vehicle fleet management of the present invention.

Referring to FIG. 1, an exemplary embodiment of a system for tire sensor-based autonomous vehicle fleet management of the present invention is indicated generally at 50. The system includes an autonomous vehicle 24, which in turn includes a plurality of tires 10 (FIG. 2). At least one tire 10, and preferably all of the tires, include the tire sensor 22. Preferably, each sensor 22 includes tire identification information by which each individual tire 10 may be identified. Each tire sensor 22 measures selected parameters and conditions of the tire 10 in which the sensor is installed.

For example, the sensor 22 may include a temperature sensor for monitoring the temperature of the tire 10 and a tire pressure sensor for monitoring the air pressure within the air cavity 20. Other parameters may also be sensed or measured by the sensor 22. The sensor 22 may include additional components, such as surface acoustic wave (SAW) devices, radio frequency identification (RFID) devices, signal and data storage and transmission components, signal reception components, data processing components including microprocessors and microcontrollers, a battery, a rechargeable battery, and/or means for energy harvesting to power the sensor. An exemplary sensor 22 is described in U.S. patent application Ser. No. 15/083,356, which is owned by the same Assignee as the present invention, The Goodyear Tire & Rubber Company, and is fully incorporated herein by reference.

As mentioned above, one or more transmitters preferably are included with the sensor 22 for wirelessly transmitting 26 the tire identification data, temperature data, pressure data and other selected data measured or collected by the sensor to a control system or central processing unit 28 on the vehicle 24. For example, most vehicles 24 include a CAN-Bus 28, which is a communications network that enables communications 30 between microcontrollers and devices in the vehicle.

In the tire sensor-based autonomous vehicle fleet management system 50, once data is communicated to the CAN-Bus 28, the CAN-Bus uploads the data 32 to a mobile network 34. The mobile network 34 is in wireless communication 36 with a fleet management server 38, which collects the data for analysis at a central location. The collected data from the server 38 is communicated 40 to human operators or to algorithms for a fleet management decision 42. Examples of fleet management decisions 42 are described in greater detail below. The decision 42 is communicated 44 to the server 38, which generates a command for the autonomous vehicle 24 and sends it 46 to the mobile network 34. The mobile network 34 transmits the command 48 to the vehicle CAN-Bus 28, which distributes it 52 to the appropriate systems in the autonomous vehicle 24. The systems then adjust the operating conditions of the vehicle 24 accordingly.

For example, data from the sensor 22 may include inflation pressure and temperature signals, as well as each tire identification (ID) on the vehicle 10 and, in the same time frame, the belt speed, tire angular velocity, and/or contact patch width, contact patch length, contact patch characteristics or deflection or load on the tire. The data is sent 26 to the CAN-Bus 28, uploaded 32 to the mobile network 34, sent 36 to the fleet management server 38 and communicated 40 to the decision maker 42. If the data indicates low pressure in the tire 10, the decision may be made for the vehicle 24 to report for maintenance. A corresponding command is communicated 44 to or generated by the fleet management server 38, which sends 46 the command through the mobile network 34 to be downloaded 48 in the CAN-Bus 28. The CAN-Bus 28 actuates 52 the operational systems in the autonomous vehicle 24 in real time to bring the vehicle into a selected maintenance center for inflation of the tire 10, or to actuate a tire inflation system that may be on board the vehicle.

Likewise, the sensor 22 may indicate the speed of rotation of the tire 10, which can be used to determine the speed of the vehicle 24. If the speed is too low, a command to increase a throttle setting on the vehicle 24 may be communicated in real time to the CAN-Bus 28 and thus the operational systems of the vehicle to increase its speed. If the speed is too high, a command to decrease a throttle setting or actuate a brake system on the vehicle 24 may be communicated in real time to the CAN-Bus 28 to decrease the speed of the vehicle.

The sensor 22 may provide data for determination of weather/road roughness/slipperiness conditions as well as wear condition of the tire 10. For example, the sensor 22 may utilize tread and road texture parameters to enhance road sensing capability, and/or may include a tri-axial accelerometer for creating a circumferential signal, a lateral signal, and/or a radial signal. The circumferential signal may determine a slip ratio for the tire 10, the lateral signal may determine a slip angle for the tire, and the radial signal may determine a load on the tire. In the tire sensor-based autonomous vehicle fleet management system 50, this data is communicated as described above to the fleet management server 38. If the data indicates excessive slipping of the tire 10, a decision can be made to apply the brake system of the autonomous vehicle 24, which is sent to the CAN-Bus 28 for real-time actuation of the brake system. A decision may also be made to change the route of the vehicle 24, which is sent to the CAN-Bus 28 for real-time actuation of the navigation and steering systems of the vehicle for execution.

In addition, the sensor 22 may generate data that is employed in methods that estimate the amount of wear of the tire 10. For example, algorithms stored on the fleet management server 38 may analyze the data from the sensor 22, leading to a decision 42 that the tire 10 is worn enough to be replaced. A command is sent to the CAN-Bus 28 as described above, which actuates 52 the operational systems in the autonomous vehicle 24 in real time to bring the vehicle into a selected maintenance center for replacement of the tire 10.

Figure 3A:
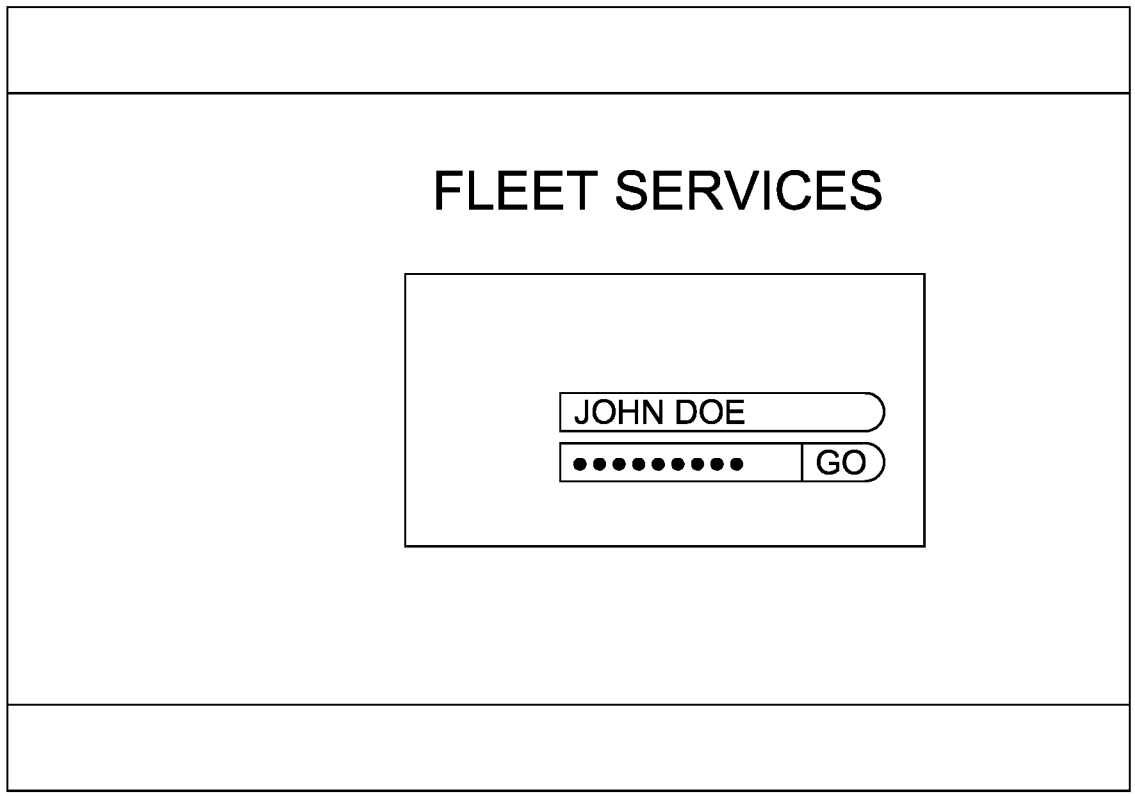
Figure 3B:
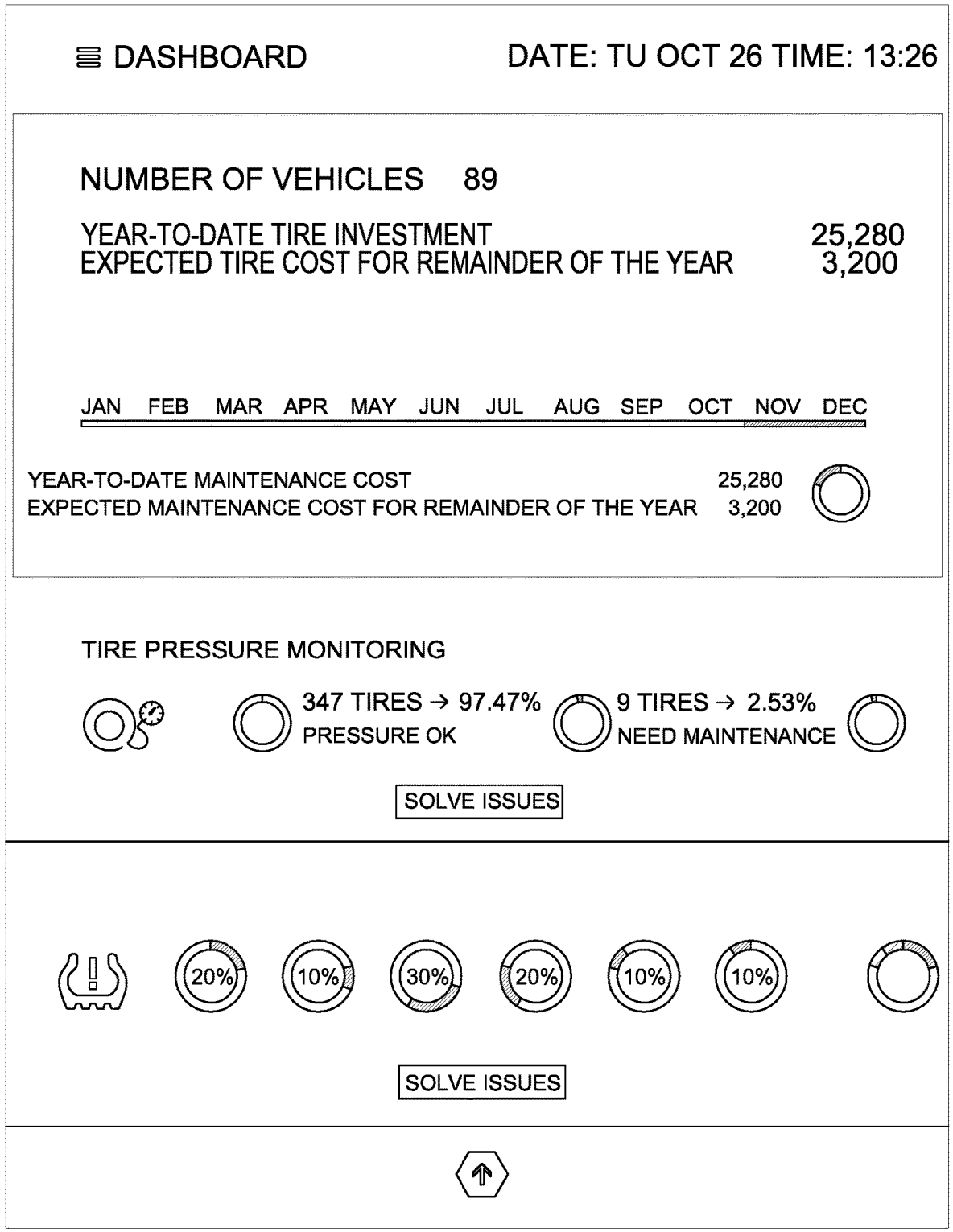
Figure 3C:
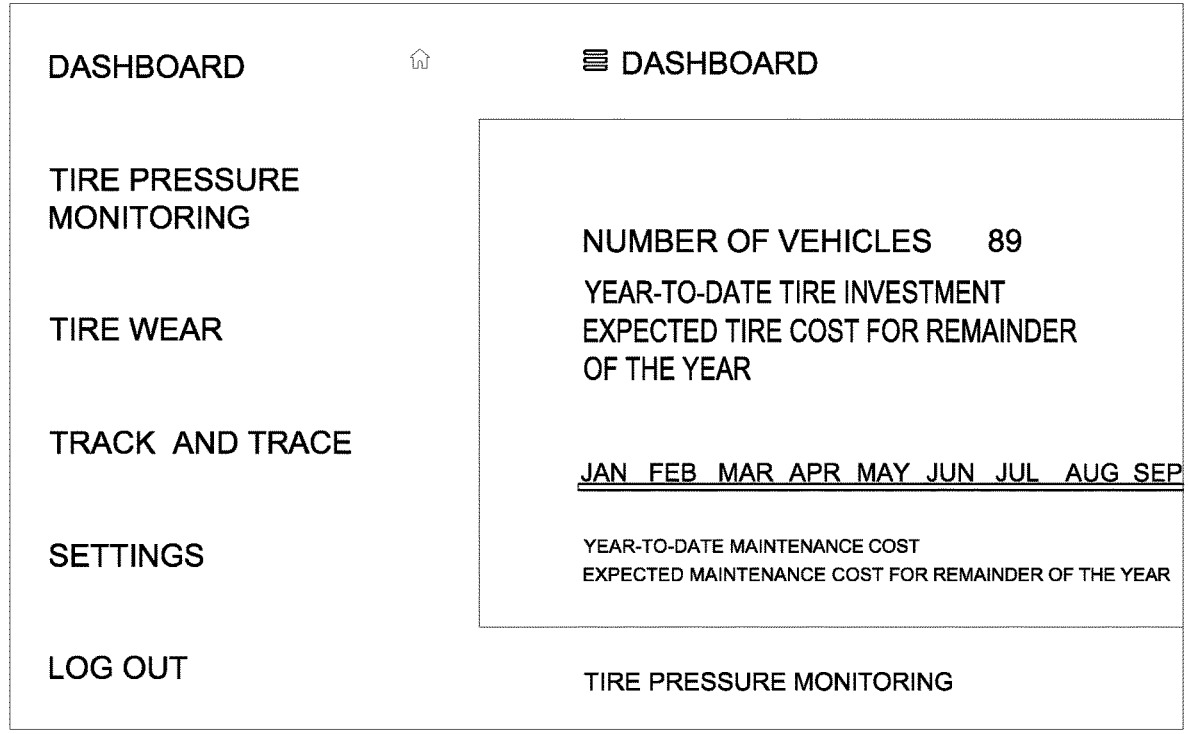
Figure 3E:
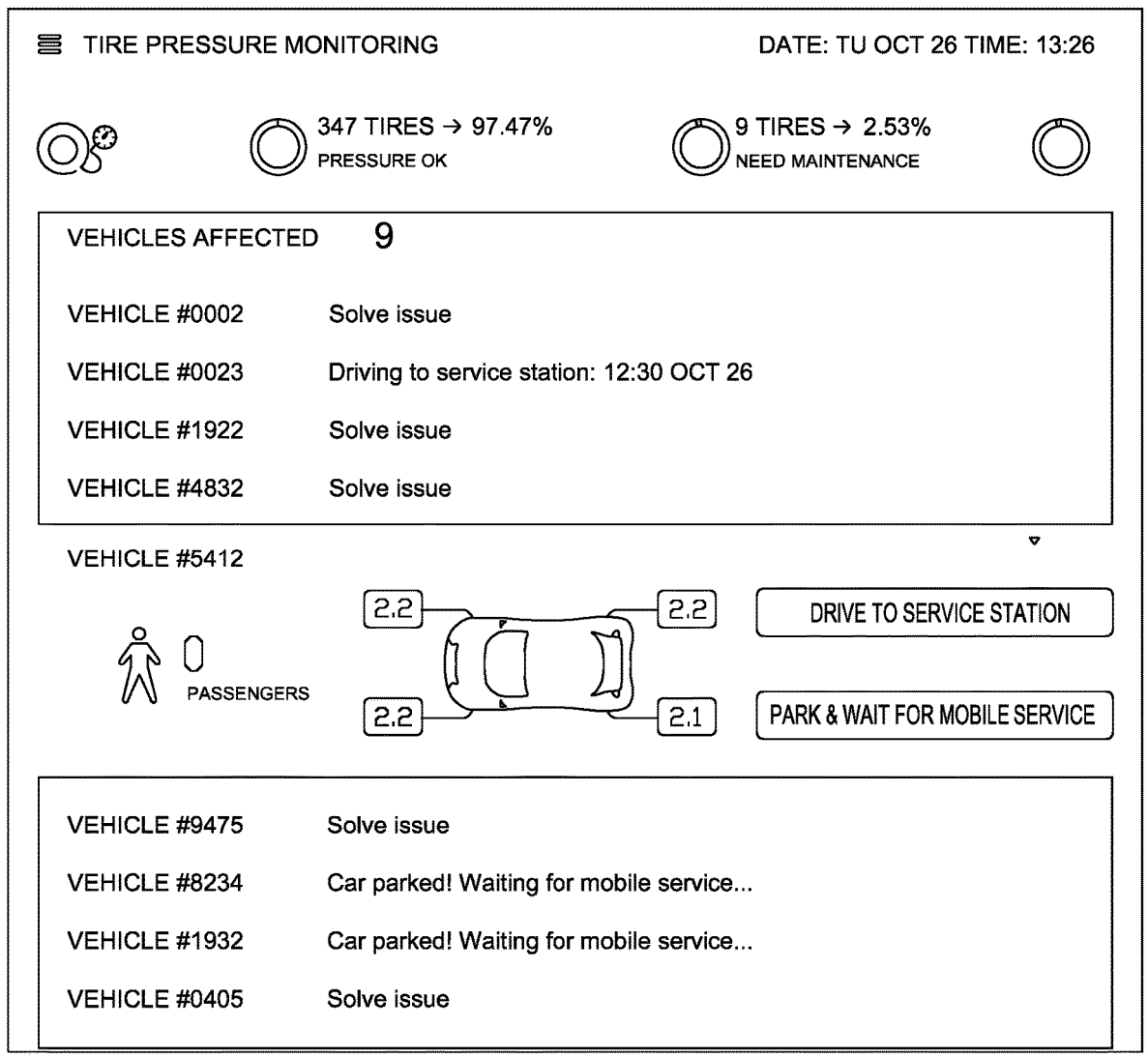
Figure 3G:
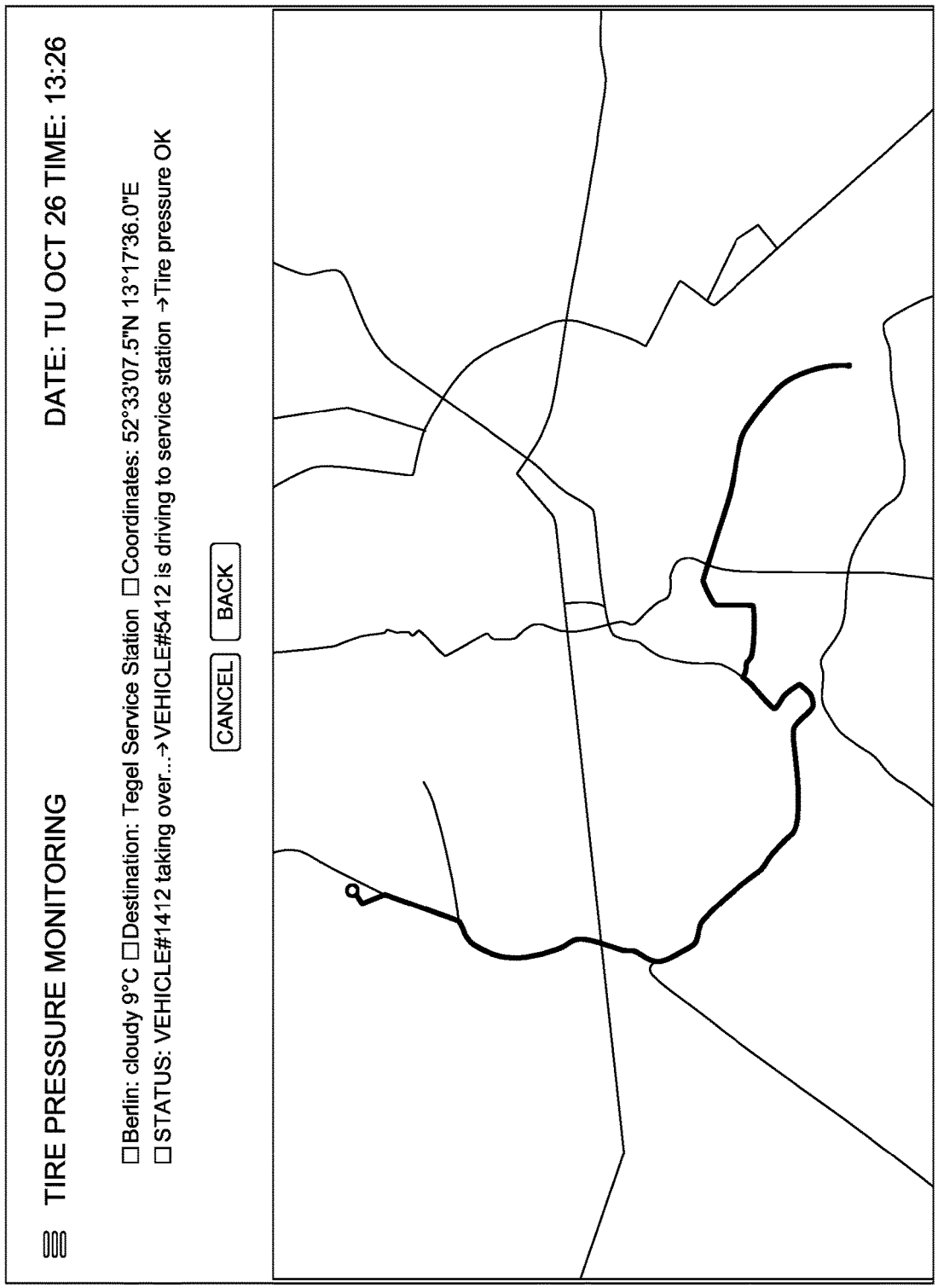
Figure 3I:
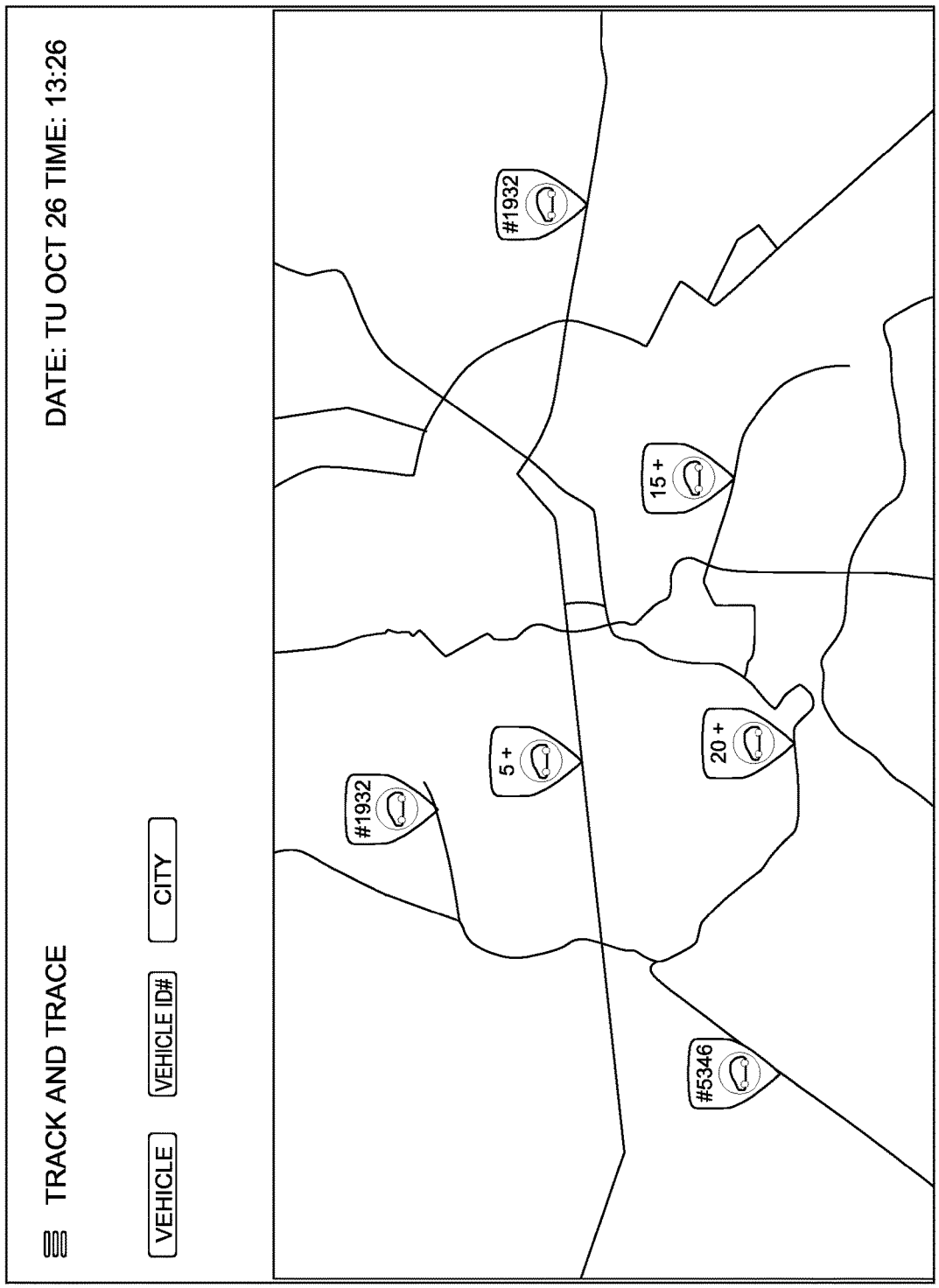

An optional interface for executing the fleet management decision 42 in the tire sensor-based autonomous vehicle fleet management system 50 is shown in FIGS. 3a through 3i. The interface may include an App, which is application software that is designed to run on a mobile device, such as a smartphone. The mobile device readily enables a fleet manager to review data from the tire sensors 22 to make appropriate fleet management decisions 42 and enter them into the system 50. For example, a decision maker logs into the App through a login screen as shown in FIG. 3a. FIG. 3b is an App dashboard that displays selected fleet historical data and selected real-time parameters from the sensors 22 for respective autonomous vehicles 24. FIG. 3c is a screen displaying detailed historical information for the fleet, while FIG. 3d is a real-time display summarizing characteristics of autonomous vehicles 24 in the fleet. FIG. 3e shows a breakout of real-time tire pressure data from tire sensors 22 for a selected vehicle 24, and FIG. 3f illustrates entry of a decision 42 into the system 50 for the selected vehicle. FIG. 3g shows the status and routing information for a selected vehicle 24, while FIG. 3h shows a real-time breakout of tire wear data for the vehicle. FIG. 3i illustrates tracking of the autonomous vehicles 24 in the fleet to enable convenient monitoring and management of the fleet.

In this manner, the tire sensor-based autonomous vehicle fleet management system 50 includes tire sensors 22 that measure tire parameters and means to communicate the data for those parameters to a fleet management server 38 for decisions regarding vehicle operation. Commands from the decisions are communicated to the CAN-Bus 28 of each autonomous vehicle 24 for execution by the vehicle systems. The tire sensor-based autonomous vehicle fleet management system 50 thus enables remote, real-time monitoring and control of autonomous vehicles 24 in a fleet. Such monitoring and control includes real-time adjustment of the operating conditions of the vehicle 24 based upon the parameters of the tire 10 as sensed or measured by each sensor 22, such as real-time adjustment of the driving speed and/or the route of the vehicle. Such monitoring and control also includes identification of tire-related issues, thereby enabling proactive maintenance of the tire 10 and/or the vehicle 24 to optimize vehicle operating time.

The present invention also includes a method of sensing tire parameters for use in the management of a fleet of autonomous vehicles, thereby optimizing vehicle usage and performance. The method includes steps in accordance with the description that is presented above and shown in FIGS. 1 through 3i.

It is to be understood that the structure of the above-described tire sensor-based autonomous vehicle fleet management system may be altered or rearranged, or components known to those skilled in the art omitted or added, without affecting the overall concept or operation of the invention. It is also to be understood that the above-described method of sensing tire parameters for use in the management of a fleet of autonomous vehicles may be altered or rearranged, or steps known to those skilled in the art omitted or added, without affecting the overall concept or operation of the invention.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for sensing tire parameters in remote monitoring and management of a fleet of autonomous vehicles, the system comprising:
   at least one autonomous vehicle supported by at least one tire;
   at least one sensor being affixed to the at least one tire for sensing tire parameters, the at least one sensor including tire identification information to identify the at least one tire;
   means for communicating data generated by the at least one sensor;
   a mobile network for receiving the data generated by the at least one sensor;
   a fleet management server for receiving from the mobile network the data generated by the at least one sensor; and
   means for generating commands for the autonomous vehicle in real time based upon the data generated by the at least one sensor, the commands including a command to bring the autonomous vehicle into a selected maintenance center.

2. The system for sensing tire parameters in remote monitoring and management of a fleet of autonomous vehicles of claim 1, wherein the means for communicating the data generated by the at least one sensor includes means for communicating the data to a control system on the vehicle, in which the mobile network receives the data from the control system on the vehicle.

3. The system for sensing tire parameters in remote monitoring and management of a fleet of autonomous vehicles of claim 2, wherein the control system on the vehicle includes a CAN-Bus.

4. The system for sensing tire parameters in remote monitoring and management of a fleet of autonomous vehicles of claim 1, wherein the means for communicating data generated by the at least one sensor includes a transmitter for wireless data transmission.

5. The system for sensing tire parameters in remote monitoring and management of a fleet of autonomous vehicles of claim 1, wherein the means for generating commands includes at least one of a human operator and an algorithm.

6. The system for sensing tire parameters in remote monitoring and management of a fleet of autonomous vehicles of claim 1, wherein the means for generating commands includes a software application.

7. The system for sensing tire parameters in remote monitoring and management of a fleet of autonomous vehicles of claim 1, wherein the at least one sensor includes at least one of a temperature sensor and a pressure sensor.

8. The system for sensing tire parameters in remote monitoring and management of a fleet of autonomous vehicles of claim 1, wherein the tire parameters include at least one of an inflation pressure, a temperature signal, a belt speed, an angular velocity, a contact patch length, a contact patch width, characteristics of a contact patch, a deflection, a load, a speed of rotation, a tread condition, a tread structure, and a wear condition of the tire.

9. The system for sensing tire parameters in remote monitoring and management of a fleet of autonomous vehicles of claim 1, wherein the at least one sensor includes an accelerometer.

10. The system for sensing tire parameters in remote monitoring and management of a fleet of autonomous vehicles of claim 9, wherein the accelerometer is a tri-axial accelerometer for creating at least one of a circumferential signal, a lateral signal, and a radial signal.

11. A method for sensing tire parameters in remote monitoring and management of a fleet of autonomous vehicles, the method comprising the steps of:
affixing at least one sensor to at least one tire of at least one autonomous vehicle, the at least one sensor including tire identification information to identify the at least one tire;
measuring tire parameters with the at least one sensor;
communicating to a mobile network data generated by the at least one sensor;
receiving on a fleet management server from the mobile network the data generated by the at least one sensor; and
generating commands for the autonomous vehicle in real time based upon the data generated by the at least one sensor, the commands including a command to bring the autonomous vehicle into a selected maintenance center.

12. The method for sensing tire parameters in remote monitoring and management of a fleet of autonomous vehicles of claim 11, wherein the step of communicating the sensor data to a mobile network includes communicating the data a control system on the vehicle and uploading the data from the control system on the vehicle to the mobile network.

13. The method for sensing tire parameters in remote monitoring and management of a fleet of autonomous vehicles of claim 12, further comprising the step of communicating the commands to the control system on the vehicle.

14. The method for sensing tire parameters in remote monitoring and management of a fleet of autonomous vehicles of claim 12, wherein the step of communicating the data generated by the at least one sensor to a control system on the vehicle includes communicating the data to a CAN-Bus.

15. The method for sensing tire parameters in remote monitoring and management of a fleet of autonomous vehicles of claim 11, wherein the step of communicating data generated by the at least one sensor includes providing a transmitter for wireless data transmission.

16. The method for sensing tire parameters in remote monitoring and management of a fleet of autonomous vehicles of claim 11, wherein the step of generating commands for the autonomous vehicle in real time based upon the data generated by the at least one sensor includes at least one of a human operator and an algorithm providing a decision based upon the data.

17. The method for sensing tire parameters in remote monitoring and management of a fleet of autonomous vehicles of claim 11, wherein the step of generating commands for the autonomous vehicle in real time based upon the data generated by the at least one sensor includes providing a software application.

18. The method for sensing tire parameters in remote monitoring and management of a fleet of autonomous vehicles of claim 11, wherein the step of providing at least one sensor affixed to at least one tire of at least one autonomous vehicle includes providing at least one of a temperature sensor and a pressure sensor.

19. The method for sensing tire parameters in remote monitoring and management of a fleet of autonomous vehicles of claim 11, wherein the step of providing at least one sensor affixed to at least one tire of at least one autonomous vehicle includes providing a tri-axial accelerometer for creating at least one of a circumferential signal, a lateral signal, and a radial signal.

20. The method for sensing tire parameters in remote monitoring and management of a fleet of autonomous vehicles of claim 11, wherein the step of measuring tire parameters with the at least one sensor includes measuring at least one of an inflation pressure, a temperature signal, a belt speed, an angular velocity, a contact patch length, a contact patch width, characteristics of a contact patch, a deflection, a load, a speed of rotation, a tread condition, a tread structure, and a wear condition of the tire.

* * * * *